(12) United States Patent
Nishimura

(10) Patent No.: US 9,643,500 B2
(45) Date of Patent: May 9, 2017

(54) VEHICULAR CONTROL DEVICE

(71) Applicant: TOYOTA JIDOSHA KABUSHIKI KAISHA, Toyota-shi, Aichi-ken (JP)

(72) Inventor: Yukimasa Nishimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/816,676

(22) Filed: Aug. 3, 2015

(65) Prior Publication Data

US 2016/0089990 A1 Mar. 31, 2016

(30) Foreign Application Priority Data

Sep. 25, 2014 (JP) ................................. 2014-195224

(51) Int. Cl.
*B60L 9/00* (2006.01)
*B60L 11/18* (2006.01)

(52) U.S. Cl.
CPC ....... *B60L 11/1803* (2013.01); *Y02T 10/6239* (2013.01); *Y02T 10/642* (2013.01); *Y02T 10/7005* (2013.01); *Y02T 10/7241* (2013.01)

(58) Field of Classification Search
CPC ... B60R 16/023; B60R 2300/302; B60L 7/14; B60L 2240/423; B60L 2240/429; B60L 11/005; B60L 11/14; B60L 3/0061; B60L 11/1803; B60L 3/04; B60L 2240/443; B60L 2240/526; B60L 2240/527; B60L 2240/529; B60L 15/025; B60L 2240/12; B60L 2240/421; B60L 15/2009; B60L 2210/40; B60L 2220/14; B60L 2220/42; B60L 2220/44; B60L 2220/46; B60L 2240/427; B60L 2250/24; B60L 2250/26; B60L 2260/28; B60L 3/0038; B60L 7/26; B60L 9/18
See application file for complete search history.

(56) References Cited

U.S. PATENT DOCUMENTS 9,114,698 B2 * 8/2015 Amano ................. B60L 3/0007
2002/0117933 A1 * 8/2002 Joong ...................... B60K 6/26
310/261.1
(Continued)

FOREIGN PATENT DOCUMENTS

JP 2006-050764 A 2/2006
JP 2013-051755 A 3/2013

*Primary Examiner* — Nicholas Kiswanto
*Assistant Examiner* — Kenny A Taveras
(74) *Attorney, Agent, or Firm* — Oliff PLC

(57) ABSTRACT

A vehicular control device includes a rotation angle sensor sensing a rotation angle of a rotor of a motor, and a control device controlling the motor. When the control device controls the motor and detects that the vehicle has a collision, the control device determines a switching pattern, based on the rotation angle obtained from the rotation angle sensor, to switch a switching device of an inverter that drives the motor to zero a q axis current and also pass a d axis current, and once the switching pattern has been determined, then, whatever rotation angle may be sensed by the rotation angle sensor, the determined switching pattern is applied to discharge the electric charge of a smoothing capacitor connected to the inverter of the motor. This allows the smoothing capacitor's electric charge to be discharged if the rotation angle sensor has failed.

4 Claims, 8 Drawing Sheets

(56) References Cited

U.S. PATENT DOCUMENTS

| | | | | |
|---|---|---|---|---|
| 2009/0115355 A1* | 5/2009 | Oyobe | ................ | H02M 7/493 |
| | | | | 318/34 |
| 2010/0213904 A1* | 8/2010 | Yamada | ................ | B60L 3/003 |
| | | | | 320/166 |
| 2010/0328014 A1* | 12/2010 | Suzuki | .................... | H01H 9/12 |
| | | | | 337/30 |
| 2011/0210687 A1* | 9/2011 | Tsuji | .................. | H02P 21/0003 |
| | | | | 318/400.02 |
| 2011/0309777 A1* | 12/2011 | Welchko | ................ | B60L 3/04 |
| | | | | 318/376 |
| 2012/0068532 A1* | 3/2012 | Tanabe | ..................... | B60L 3/04 |
| | | | | 307/10.1 |
| 2013/0049663 A1* | 2/2013 | Amano | ................ | B60L 3/0007 |
| | | | | 318/453 |
| 2014/0062185 A1* | 3/2014 | Nakamura | ............ | B60L 3/0007 |
| | | | | 307/10.1 |
| 2014/0174844 A1* | 6/2014 | Nakai | ................. | B62D 5/0481 |
| | | | | 180/446 |
| 2014/0225537 A1* | 8/2014 | Omata | ................ | H02P 21/0035 |
| | | | | 318/400.02 |
| 2015/0015169 A1* | 1/2015 | Yanagi | ..................... | H02P 6/24 |
| | | | | 318/400.02 |
| 2015/0231972 A1* | 8/2015 | Oi | ............................ | B60L 3/04 |
| | | | | 307/10.1 |
| 2015/0343904 A1* | 12/2015 | Ikeyama | ............... | B60L 3/0007 |
| | | | | 701/22 |
| 2016/0089990 A1* | 3/2016 | Nishimura | .......... | B60L 11/1803 |
| | | | | 701/22 |

* cited by examiner

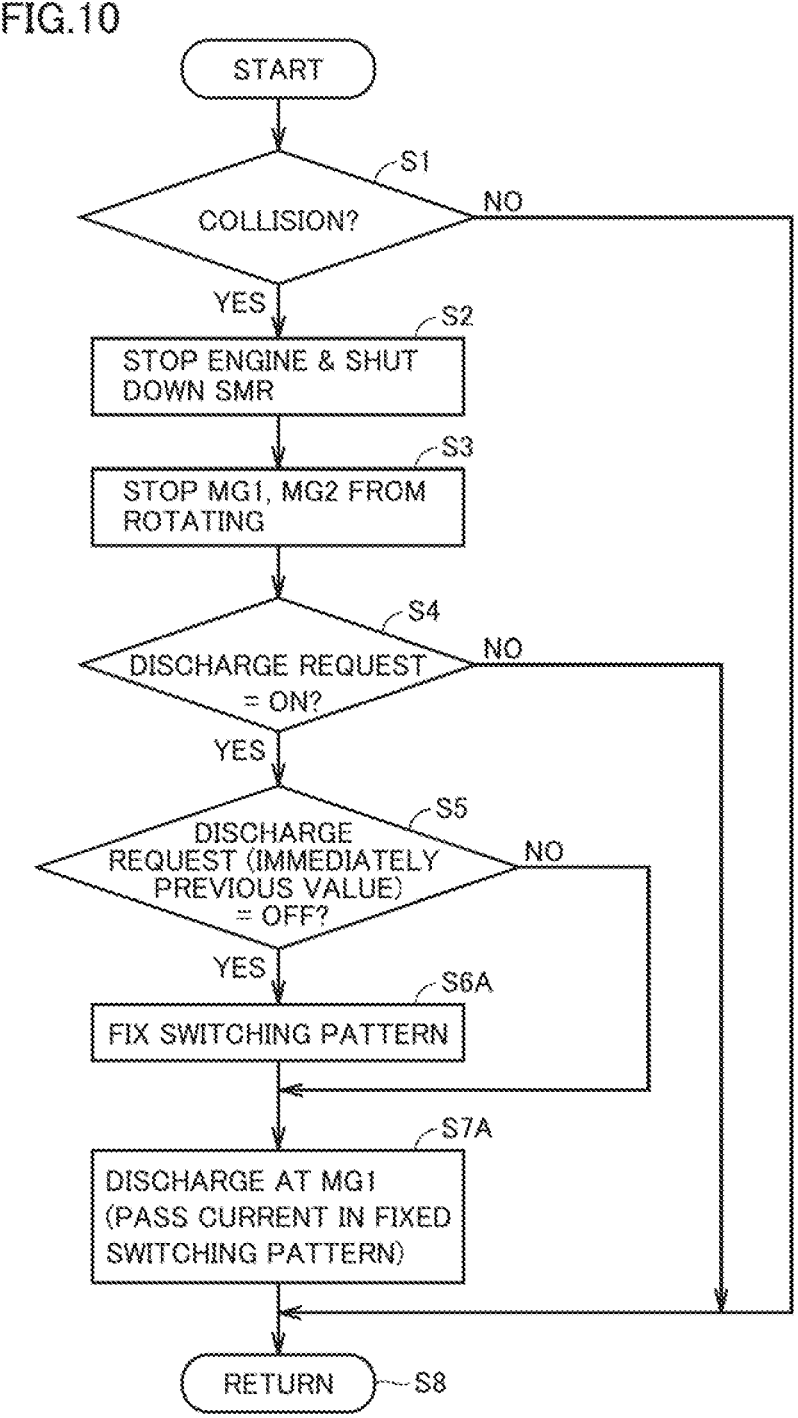

VEHICULAR CONTROL DEVICE

This nonprovisional application is based on Japanese Patent Application No. 2014-195224 filed on Sep. 25, 2014, with the Japan Patent Office, the entire contents of which are hereby incorporated by reference.

BACKGROUND OF THE INVENTION

Field of the Invention

The present invention relates to a vehicular control device, and more specifically to control applied to discharge the electric power that is stored in a vehicle at a smoothing capacitor when the vehicle has a collision.

Description of the Background Art

Electric vehicles, hybrid vehicles and other vehicles are widely used. These vehicles can run by driving power generated by an electric motor. Such a vehicle driving motor is driven with a power supply system receiving direct current (dc) voltage from a battery or a similar dc power supply and converting the received dc voltage into alternate current (ac) voltage via an inverter. Such a power supply system generally has the inverter with an input side (or a dc voltage side) provided with a smoothing capacitor.

Japanese Patent Laying-Open No. 2013-051755 discloses a control device of a vehicle having a permanent magnet synchronous motor mounted as a driving source. When the vehicle has a collision the control device operates to rapidly discharge the electric charge of a smoothing capacitor of an inverter supplying the motor with an ac current while the control device operates to minimize a torque unintentionally generated in the motor, even in a condition that the vehicle has a tire spinning and accordingly, the motor rotating.

Japanese Patent Laying-Open No. 2013-051755, however, does not discuss discharging the electric charge of the smoothing capacitor while a rotation angle sensor that senses the motor's rotation angle has failed, and thus there is a room for improvement.

The present invention has been made to address the above issue, and contemplates a vehicular control device allowing a smoothing capacitor's electric charge to be discharged while a rotation angle sensor has failed.

SUMMARY OF THE INVENTION

In summary, the present invention provides a vehicular control device providing a motor mounted in a vehicle with a current control value for a q axis current generating a torque and a d axis current generating a magnetic field to control the motor, the vehicular control device comprising: a rotation angle sensor sensing a rotation angle of a rotor of the motor; and a control unit controlling the motor based on the rotation angle sensed by the rotation angle sensor. When the control unit controls the motor, and detects that the vehicle has a collision, the control unit determines a switching pattern, based on the rotation angle obtained from the rotation angle sensor, to switch a switching device of an inverter that drives the motor to zero the q axis current and also pass the d axis current, and once the switching pattern has been determined, then, whatever rotation angle may be sensed by the rotation angle sensor, the switching pattern is applied to discharge an electric charge of a smoothing capacitor connected to the inverter of the motor.

Thus, if the rotation angle sensor has failed, and the vehicle has a collision, the smoothing capacitor's electric charge can still be discharged. If the rotation angle sensor operates properly, the discharge can be done with the motor free of torque, and even if the rotation angle sensor does not operate properly, a discharge current can be passed with the motor's rotation minimized.

Preferably the motor is a first motor generator operating mainly as an electric power generator. The vehicle further includes a second motor generator operating mainly as an electric motor to drive a vehicular wheel. The control unit passes a current through the first motor generator, rather than the second motor generator, to discharge the electric charge of the smoothing capacitor when the vehicle has a collision.

This further reduces the motor's rotation more than discharging via the second motor generator does.

Preferably, when the control unit detects that the vehicle has a collision, the control unit stores a rotation angle sensed by the rotation angle sensor and fixes the switching pattern by generating the current control value, with the stored rotation angle constantly applied as a rotation angle used to control the motor, to zero the q axis current and pass the d axis current.

Thus, if the rotation angle sensor has failed, and the vehicle has a collision, the smoothing capacitor's electric charge can still be discharged.

Preferably, the control unit generates a switching waveform, based on a voltage command and an output of the rotation angle sensor, for switching the switching device of the inverter. The control unit, before detecting a collision, feeds back a difference between a motor current and the current control value to correct a control value, and after the collision is detected, the control unit stops feeding back said difference, and, irrespective of what output the rotation angle sensor provides, the control unit constantly outputs to the inverter a switching pattern corresponding to a fixed rotation angle.

Thus, if the rotation angle sensor has failed, and the motor rotates, the current feedback can be prevented from having an effect to destabilize the discharge current.

The present invention thus allows a smoothing capacitor's electric charge to be discharged with a motor's rotation minimized while a rotation angle sensor has failed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a flowchart for illustrating a discharging process performed by hybrid ECU 144 and MGECU 142 in the second embodiment.

DESCRIPTION OF THE PREFERRED EMBODIMENTS

The present invention in embodiments will hereinafter be described in detail with reference to the drawings. In the figures, identical or corresponding components are identically denoted and will not be described repeatedly.

First Embodiment

Figure 1:
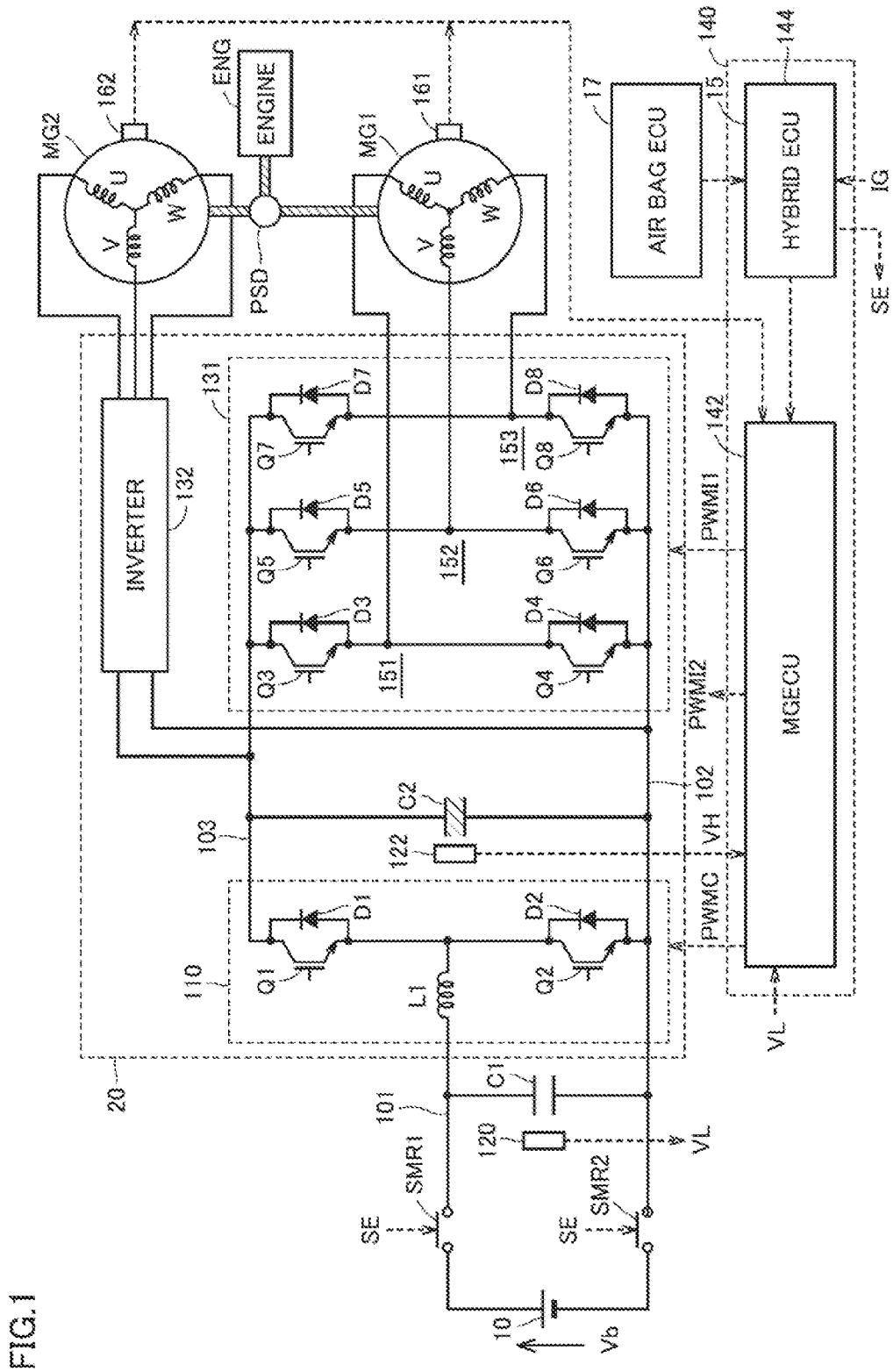
FIG. 1 is a block diagram showing a configuration of a hybrid vehicle shown as an example with the present vehicular control device applied thereto.

FIG. 1 is a block diagram showing a configuration of a hybrid vehicle shown as an example with the present vehicular control device applied thereto.

With reference to FIG. 1, the hybrid vehicle with the present vehicular control device applied thereto includes a battery 10, system main relays SMR1 and SMR2, a smoothing capacitor C1, an air bag ECU 17, a power control unit 20, motor generators MG1 and MG2, an engine ENG, a power split device PSD, and a control device 140. Control device 140 includes a hybrid ECU 144 and an MG electronic control unit (MGECU) 142. Motor generator MG1, motor generator MG2, and engine ENG are coupled to each other via power split device PSD.

MGECU 142 and hybrid ECU 144 are each configured as an electronic control unit (ECU) having a central processing unit (CPU) (not shown) and a memory (not shown) incorporated therein, and MGECU 142 and hybrid ECU 144 are configured to follow a map and program stored in the memory to perform an operational process using a value sensed by each sensor.

Battery 10 is shown as a representative example of a power storage device, and is configured including a rechargeable battery, such as a nickel metal hydride battery or a lithium ion battery. Alternatively, battery 10 may be replaced with a power storage device other than the rechargeable battery, such as an electric double layer capacitor.

System main relays SMR1 and SMR2 conduct/shut down a power supply path from battery 10 to a converter 110. Specifically, system main relay SMR1 is connected between the positive electrode of battery 10 and a positive electrode bus 101. System main relay SMR2 is connected between the negative electrode of battery 10 and a negative electrode bus 102. System main relays SMR1, SMR2 are turned on/off, as controlled in response to a signal SE issued from hybrid ECU 144.

Smoothing capacitor C1 is connected between positive electrode bus 101 and negative electrode bus 102 and smoothes voltage variation caused between positive electrode bus 101 and negative electrode bus 102. A voltage sensor 120 senses voltage VL across smoothing capacitor C1 and outputs voltage VL, as sensed, to MGECU 142.

Although motor generators MG1 and MG2 can function as both a power generator and an electric motor, motor generator MG1 mainly operates as a power generator and motor generator MG2 mainly operates as an electric motor.

When motor generators MG1 and MG2 operate in a power running mode, power control unit 20 operates to boost dc voltage received from battery 10 and convert the boosted dc voltage into an ac voltage to control motor generators MG1 and MG2 drivably.

Furthermore, when motor generators MG1 and MG2 are in a regenerative braking operation, power control unit 20 operates to convert the ac voltage that motor generators MG1 and MG2 generate into a dc voltage to charge battery 10.

The power control unit is configured, as will more specifically be described hereinafter.

Power control unit 20 includes converter 110, a smoothing capacitor C2, and inverters 131 and 132 respectively corresponding to motor generators MG1 and MG2.

As one example, converter 110 is configured as a boosting/buckboosting chopper circuit, and includes a reactor L1, power semiconductor switching devices (hereinafter also simply referred to as switching devices) Q1 and Q2, and diodes D1 and D2. A switching device in this embodiment is implemented for example as an insulated gate bipolar transistor (IGBT).

Converter 110 performs bidirectional dc voltage conversion between positive electrode bus 101 and positive electrode bus 103.

Smoothing capacitor C2 is connected between positive electrode bus 103 and negative electrode bus 102. Smoothing capacitor C2 smoothes a dc voltage output from converter 110, and supplies the smoothed dc voltage to inverters 131, 132. A voltage sensor 122 senses voltage VH across smoothing capacitor C2 and outputs voltage VH, as sensed, to MGECU 142.

Inverter 131 receives electric power generated by motor generator MG1 via a running torque transmitted from a crankshaft of engine ENG, and returns it to converter 110.

Inverter 131 includes switching devices Q3 and Q4 configuring a U phase arm 151, switching devices Q5 and Q6 configuring a V phase arm 152, and switching devices Q7 and Q8 configuring a W phase arm 153. Furthermore, switching devices Q3-Q8 between their respective collectors and emitters have antiparallel diodes D3-D8, respectively, connected thereto to pass a current from their respective emitters to their respective collectors. Switching devices Q3-Q8 are turned or switched on/off, as controlled in response to a switching control signal PWMI1 issued from MGECU 142.

Motor generator MG1 is a 3-phase permanent magnet motor having a U phase coil, a V phase coil and a W phase coil commonly connected to a neutral point.

Motor generators MG1, MG2 have rotation angle sensors 161, 162, respectively, attached thereto to sense their rotors' rotational positions. Rotation angle sensor 161, 162 is representatively configured as a resolver.

Inverter 132 receives a dc voltage output from converter 110, converts the dc voltage into a 3 phase ac voltage, and outputs the 3 phase ac voltage to motor generator MG2. Furthermore, inverter 132 returns to converter 110 the electric power generated by motor generator MG2 as regenerative braking is applied.

Inverter 132 has an internal configuration similar to that of inverter 131 and thus will not be described in detail. Inverter 132 has each phase arm configured of switching devices, which are switched as controlled in response to a switching control signal PWMI2 issued from MGECU 142.

As well as motor generator MG1, motor generator MG2 is a 3-phase permanent magnet motor having a U phase coil, a V phase coil and a W phase coil commonly connected to a neutral point.

Hybrid ECU 144 operates in response to a variety of pedals being operated or the like to generate an operation command for each motor generator MG1, MG2 and output the operation command to MGECU 142 to generate driving force, electric power and the like as desired. The operation command includes an instruction to permit/prohibit operation of each motor generator MG1, MG2, a torque control value, a rotation speed command, and the like.

MGECU 142 generates switching control signal PWMI1 via a feedback control based on a value of a motor drive current of each phase as sensed by and received from a current sensor (not shown) disposed at motor generator MG1, and a value in rotation angle of the rotor as sensed by and received from rotation angle sensor 161. Switching control signal PWMI1 controls switching devices Q3-Q8 to be switched to cause motor generator MG1 to operate in accordance with an operation command issued from hybrid ECU 144.

Furthermore, MGECU 142 generates switching control signal PWMI2 via a feedback control based on a value of a motor drive current of each phase as sensed by and received from a current sensor (not shown) disposed at motor generator MG2, and a value in rotation angle of the rotor as sensed by and received from rotation angle sensor 162. Switching control signal PWMI2 controls the switching devices in inverter 132 that correspond to switching devices Q3-Q8 to be switched to cause motor generator MG2 to operate in accordance with an operation command issued from hybrid ECU 144.

Furthermore, MGECU 142 operates in response to an operation command issued from hybrid ECU 144 to calculate a voltage control value for a motor operating voltage for operating motor generators MG1 and MG2 highly efficiently, i.e., dc voltage VH corresponding to the dc side voltage of inverters 131, 132. In a normal operation, converter 110 has its duty feedforward-controlled and/or feedback-controlled so that dc voltage VH matches the voltage control value.

In the present embodiment, a signal indicating that a collision is sensed is transmitted from air bag ECU 17 to hybrid ECU 144. In response to the signal, hybrid ECU 144 senses that the hybrid vehicle has had a collision, and hybrid ECU 144 outputs a discharge request to MGECU 142.

MGECU 142, normally controlling motor generator MG1 rotatably, receives the discharge request, and in response controls motor generator MG1 to prevent it from rotating, while MGECU 142 discharges the electric charge of smoothing capacitor C2 by passing a discharge current through the stator coil of motor generator MG1.

Before describing how the passage of the discharge current is controlled, how MGECU 142 controls motor generator MG1 rotatably will be described with reference to a functional block diagram.

Figure 2:
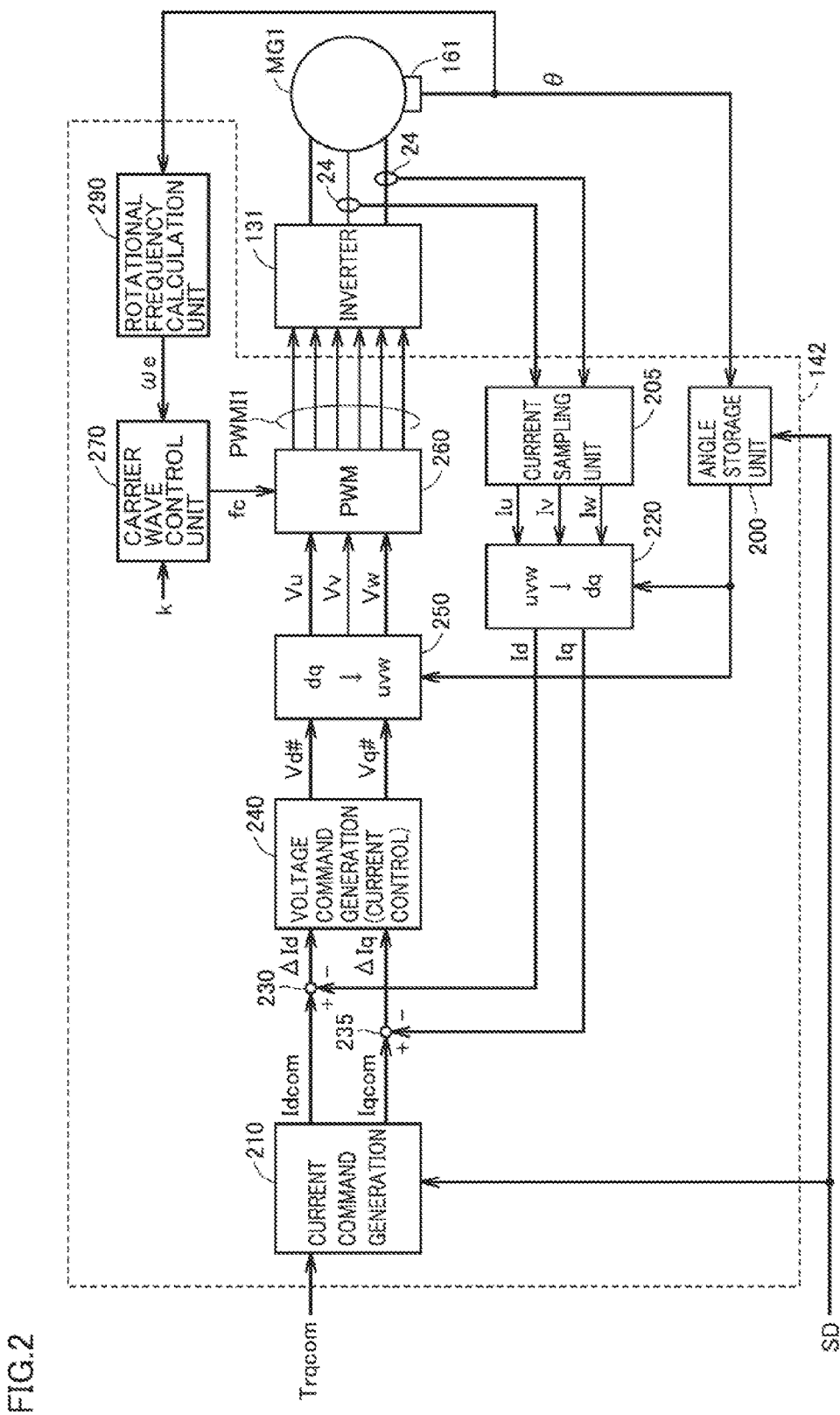
FIG. 2 is a functional block diagram for illustrating how MGECU 142 controls a motor (or a current feedback via PWM control).

FIG. 2 is a functional block diagram illustrating how MGECU 142 controls a motor (or a current feedback via PWM control). Note that each functional block described in the block diagram of FIG. 2 may be configured by a circuit (hardware) having a function corresponding to the block or may be implemented by MGECU 142 performing software processing in accordance with a previously set program.

With reference to FIG. 2, MGECU 142 includes a current command generation unit 210, coordinate conversion units 220, 250, subtraction units 230, 235, a voltage command generation unit 240, a PWM modulation unit 260, a carrier wave control unit 270, a rotational frequency calculation unit 290, and a current sampling unit 205.

Current sampling unit 205 operates in response to a periodically generated sampling instruction to sample an output of current sensor 24 to obtain sensed current values Iv and Iw of the V and W phases. The U phase's current value Iu is obtained as Iu=−(Iv+Iw). Alternatively, current sensor 24 may further be provided for the U phase, and the U phase's current Iu may be obtained by sampling a value output from current sensor 24.

In synchronous PWM control, the current sampling instruction is generated in synchronization with a carrier wave. For example, the current sampling instruction is issued for each half period of the carrier wave.

MGECU 142 is configured to control motor generator MG1 in accordance with a control calculation using sensed current values Iu, Iv, and Iw obtained via current sampling unit 205.

Current command generation unit 210 refers to a previously prepared table or the like to generate a d axis current control value Idcom and a q axis current command value Iqcom in response to a torque control value Trqcom for motor generator MG1.

Coordinate conversion unit 220 uses a rotation angle θ of motor generator MG1 as sensed by rotation angle sensor 161 to provide a coordinate conversion (a conversion of three phases to two phases) and therethrough calculates a d axis current Id and a q axis current Iq based on sensed current values Iu, Iv, Iw received from current sampling unit 205.

Voltage command generation unit 240 receives a deviation ΔId of the d axis current from its control value (i.e., ΔId=Idcom−Id) and a deviation ΔIq of the q axis current from its control value (i.e., ΔIq=Iqcom−Iq). Voltage command generation unit 240 subjects d axis current deviation ΔId and q axis current deviation ΔIq to a proportional-plus-integral (PI) operation by a prescribed gain to obtain a control deviation and in accordance with the control deviation generates a d axis voltage command value Vd# and a q axis voltage command value Vq#.

Coordinate conversion unit 250 uses rotation angle θ of motor generator MG1 to provide a coordinate conversion (from two phases to three phases) and therethrough converts d axis voltage command value Vd# and q axis voltage command value Vq# into U-, V-, and W-phase voltage commands Vu, Vv, and Vw.

Rotational frequency calculation unit 290 calculates a rotational frequency we of motor generator MG1, based on an output of rotation angle sensor 161 (i.e., rotation angle θ).

Carrier wave control unit 270 sets a carrier frequency fc based on rotational frequency we calculated by rotational frequency calculation unit 290 and a synchronization pulse count k. Note that while synchronization pulse count k may be a fixed value, it may be set variably depending on how motor generator MG1 and/or inverter 131 operate/operates.

Carrier wave control unit 270 sets carrier frequency fc based on synchronization pulse count k and rotational frequency we as calculated. Carrier frequency fc in synchronous PWM is set as fc=k·ωe. When motor generator MG1 is a 3-phase motor, synchronization pulse count k is set to be a multiple of 3.

PWM modulation unit 260 generates a carrier wave in accordance with carrier frequency fc set by carrier wave control unit 270 and also generates switching control signal PWMI1 for inverter 131 in accordance with a comparison in voltage between phase voltage commands Vu Vv, and Vw received from coordinate conversion unit 250 and the carrier wave. In response to switching control signal PWMI1, inverter 131 has each phase's upper and lower arm elements turned on/off, as controlled, to apply pseudo sine-wave voltage to each phase of motor generator MG1.

MGECU 142 receives a discharge request signal SD from hybrid ECU 144 shown in FIG. 1 to discharge the electric charges of smoothing capacitors C1 and C2. Hybrid ECU 144 outputs discharge request signal SD in response to a signal output from air bag ECU 17 detecting that the vehicle has a collision. Furthermore, hybrid ECU 144 outputs discharge request signal SD in response to a signal IG generated when the user finishes driving the vehicle and turns off the ignition key or performs a similar operation.

When discharge request signal SD is received, MGECU 142 passes a current to motor generator MG1 to discharge the electric charges of smoothing capacitors C1 and C2. In doing so, to allow the motor to be free of torque, current command generation unit 210 operates in response to discharge request signal SD to set current control value Iqcom to zero and set current control value Idcom to a prescribed value. This allows a current to be passed through motor generator MG1 with motor generator MG1 free of torque.

Herein, when rotation angle sensor 161 normally senses rotation angle θ, motor generator MG1 is free of torque. When rotation angle sensor 161 has failed, however, current control value Iqcom set to zero may fail to prevent motor generator MG1 from having a torque, since coordinate conversion unit 250 performs coordinate conversion with θ having an incorrect value.

Accordingly, in the present embodiment, MGECU 142 is provided with an angle storage unit 200, and when discharge request signal SD is received, angle θ that rotation angle sensor 161 senses at that time is stored, and the stored angle, which is set as a fixed angle θf, is provided to coordinate conversion units 220, 250. Fixed angle θf will be any value ranging from 0° to 360°. When the rotation angle is thus fixed, and rotation angle sensor 161 normally senses rotation angle θ, motor generator MG1 can be free of torque as ever. In contrast, if rotation angle sensor 161 has failed, a torque generated in motor generator MG1 can be reduced to an extent preventing the vehicle to have a significant movement. The significance of fixing the rotation angle will be described hereinafter.

Figure 3:
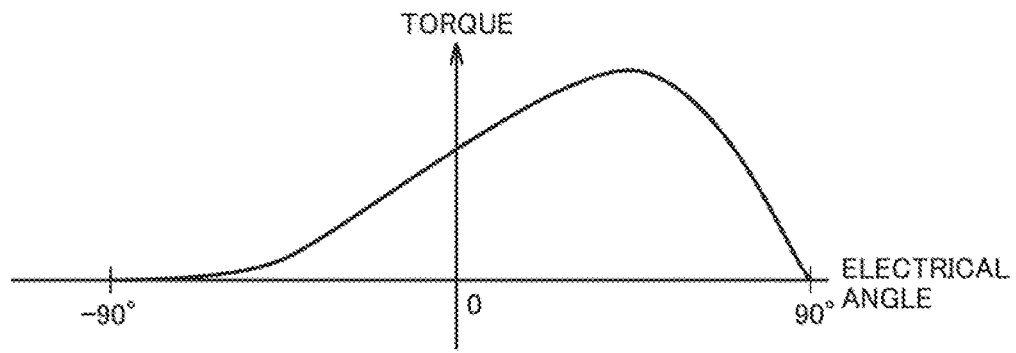
FIG. 3 shows a relationship between an electrical angle of a permanent magnet synchronous motor and a torque generated in the motor.

FIG. 3 shows a relationship between an electrical angle of a permanent magnet synchronous motor and a torque generated in the motor. FIG. 3 presents a torque curve presented for a current having a constant value. A rotor's sensed angle serves as a reference, and when a discharge current is passed at the position corresponding to 90° in electrical angle (i.e., when the q axis current is zeroed and the d axis current is passed to provide discharge), no torque is generated. When a discharge current is passed at the position corresponding to 0° in electrical angle, the q axis current will flow and a torque is generated.

When rotation angle sensor 161 normally operates, the discharge can be done accurately at the position corresponding to 90° in electrical angle (or the d axis current alone). When rotation angle sensor 161 has failed, however, it is unknown at which electrical angle the discharge is actually done.

However, at whichever electrical angle a current may be passed, the torque will be zero at −90° and 90°, as shown in FIG. 3. Accordingly, if the discharge is done at the position at which the torque is not zero, and the motor has the rotor rotated, the torque will be zero at −90° and 90°. Accordingly, the rotor only rotates from −90° to 90°, or by 180°, at the maximum. An electrical angle of 180° corresponds, for example for a 4 pole-pair motor, to a mechanical angle of 45°. If the discharge is done through motor generator MG2 directly linked to a drive shaft, the vehicle only moves in an amount of about 2 cm, although the amount more or less varies with the gear ratio.

When the rotation angle sensor has failed and outputs an erroneous angle, providing the discharge via a fixed electrical angle allows the rotor, if rotated, to have a limited rotation angle, as will be described hereinafter with reference to a schematic figure.

It is assumed that the rotation angle sensor has failed and the MGECU has recognized a value different by 180° from a correct value as the rotor's current rotation angle. In that case, the discharge is started at the position corresponding to −90° in electrical angle. In other words, while a magnetic field is intended to be generated at the position corresponding to 90° in electrical angle (for no torque), in reality, with the rotation angle sensor having failed, the magnetic field is generated at the position corresponding to −90° in electrical angle.

Figure 4:
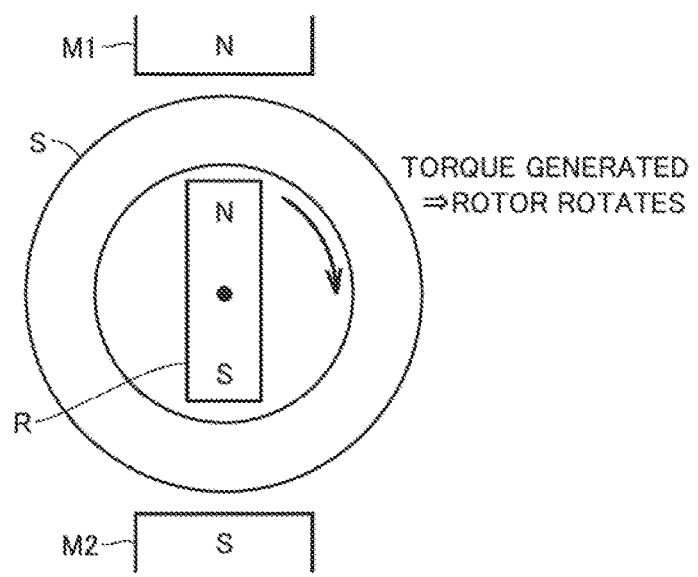
FIG. 4 is a schematic diagram showing a state in which discharging is started at a position corresponding to −90° in electrical angle.
Figure 5:
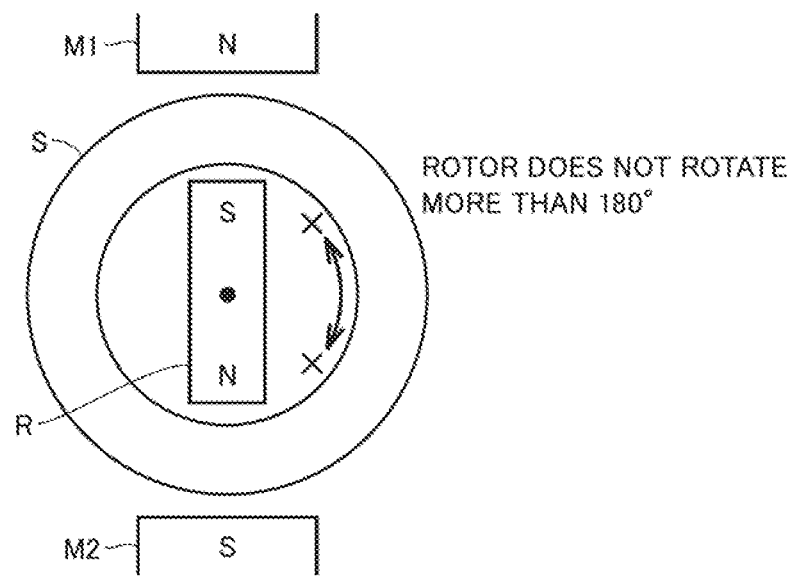
FIG. 5 is a schematic diagram showing a state in which a rotor has rotated and has a rotation angle varied to a position corresponding to 90° in electrical angle.

FIG. 4 is a schematic diagram showing a state in which the discharge is started at the position corresponding to −90° in electrical angle. FIG. 5 is a schematic diagram showing a state in which a rotor has rotated and has a rotation angle varied to the position corresponding to 90° in electrical angle. FIG. 4 and FIG. 5 show a stator S outer than a rotor R. Outer than stator S is shown an N magnetic pole M1 and an S magnetic pole M2 to schematically represent a magnetic field generated at the stator. Although in FIG. 4 a current is passed through a stator coil of stator S to zero the q axis current and bring the d axis current to a prescribed value, rotor R's rotation angle is recognized with 180° offset, and accordingly, a magnetic field has been generated to repel rotor R's N and S poles.

In FIG. 4, N magnetic pole M1 and the N pole of rotor R repel each other and S magnetic pole M2 and the S pole of rotor R repel each other, and rotor R rotates in a direction indicated by an arrow.

Herein, if the rotation angle sensor's rotation angle θ is stored and fixed, the magnetic field generated by stator S also does not rotate and remains fixed. Accordingly, if rotor R rotates from the FIG. 4 position by 180° in electrical angle and assumes the position corresponding to 90° in electrical angle, as shown in FIG. 5, the magnetic field generated at the stator is the same as shown in FIG. 4. At the position corresponding to 90° in electrical angle, the torque is zero, and the rotor stops at the position shown in FIG. 5 and no further rotates.

That is, when stator S has passed therethrough a current fixed positionally and in magnitude, and the discharge is done around −90° in electrical angle (see FIG. 4), rotor R rotates, however, it does not rotate more than 90° in electrical angle in principle (see FIG. 5).

In addition, in the present embodiment, the discharge current is passed to motor generator MG1, rather than motor generator MG2 directly linked to a drive shaft, and this further reduces the rotation of a drive shaft of the vehicle.

Figure 6:
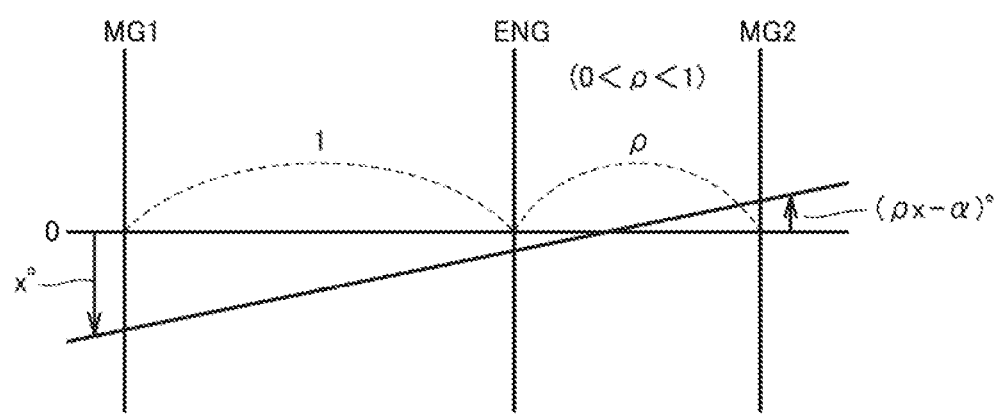
FIG. 6 is a nomographic chart showing a relationship between rotation of motor generators MG1 and MG2 and rotation of an engine.

FIG. 6 is a nomographic chart showing a relationship between rotation of motor generators MG1 and MG2 and rotation of the engine. Power split device PSD shown in FIG. 1 is a planetary gear mechanism including a sun gear, a ring gear and a planetary carrier. Motor generator MG1, motor generator MG2 and engine ENG have their respective rotary shafts connected to the sun gear, the ring gear and the planetary carrier, respectively. Note that motor generator MG2 has its rotary shaft connected to a drive shaft that drives a driving wheel of the vehicle by a chain or a gear. Their rotational speeds are aligned on a straight line as shown in FIG. 6.

Hereinafter will be discussed a case in which a discharge current is passed and torque is generated, and this torque rotates the rotary shaft of motor generator MG1 in the negative direction by X°. If the engine is not rotating, and the planetary gear has a gear ratio ρ, wherein 0<ρ<1 and representatively ρ=0.5, then the rotary shaft of motor generator MG2 has a rotation angle of ρX°. When the engine's counter rotation is considered, the rotary shaft of motor generator MG2 has a rotation angle of (ρX−α)°, which is an angle smaller than ρX°.

That is, when the discharge current is passed to motor generator MG2 with the electrical angle fixed, the motor only rotates by 180° in electrical angle, and if the motor is a 4 pole-pair motor, it will rotate by 45° in mechanical angle, and the vehicle only moves for example by about 2 cm. Furthermore, discharging via motor generator MG1, rather than motor generator MG2, allows the vehicle to have the drive shaft rotated by a further reduced angle as the planetary gear has gear ratio ρ set to be smaller than 1. Thus, a distance that the vehicle passes through when the discharge is done and a torque is accordingly generated, can further be reduced to be smaller for example than 2 cm.

Figure 7:
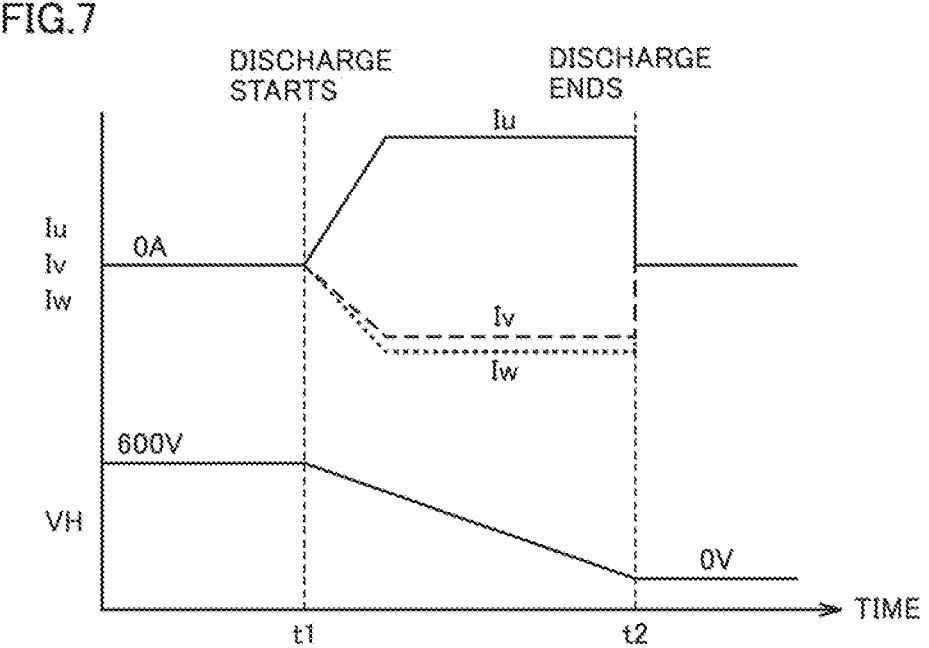
FIG. 7 is a waveform diagram for illustrating a condition in which a discharge current flows.

FIG. 7 is a waveform diagram for illustrating a condition in which a discharge current flows. With reference to FIG. 1 and FIG. 7, the discharge is not started before time t1, and smoothing capacitor C2 has voltage VH of 600V. At time t1, that the vehicle has a collision is sensed, and system main relays SMR1 and SMR2 are shut down, and thereafter, discharging the electric charges of smoothing capacitors C1, C2 starts. For time t1-t2, inverter 131 is controlled to allow the motor generator MG1 U-, V- and W-phase coils to have a positive current Iu, a negative current Iv and a negative current Iw, respectively, passing therethrough.

The U phase coil, the V phase coil, and the W phase coil each have one end connected to the neutral point and accordingly, Iu+Iv+Iw=0, and if Iu=1, switching devices Q3, Q6, Q8 have their switching duty ratio controlled to provide Iw=Iv=−0.5.

As a result, for time t1-t2, voltage VH decreases from 600V to 0V, and the discharge is completed at time t2.

Figure 8:
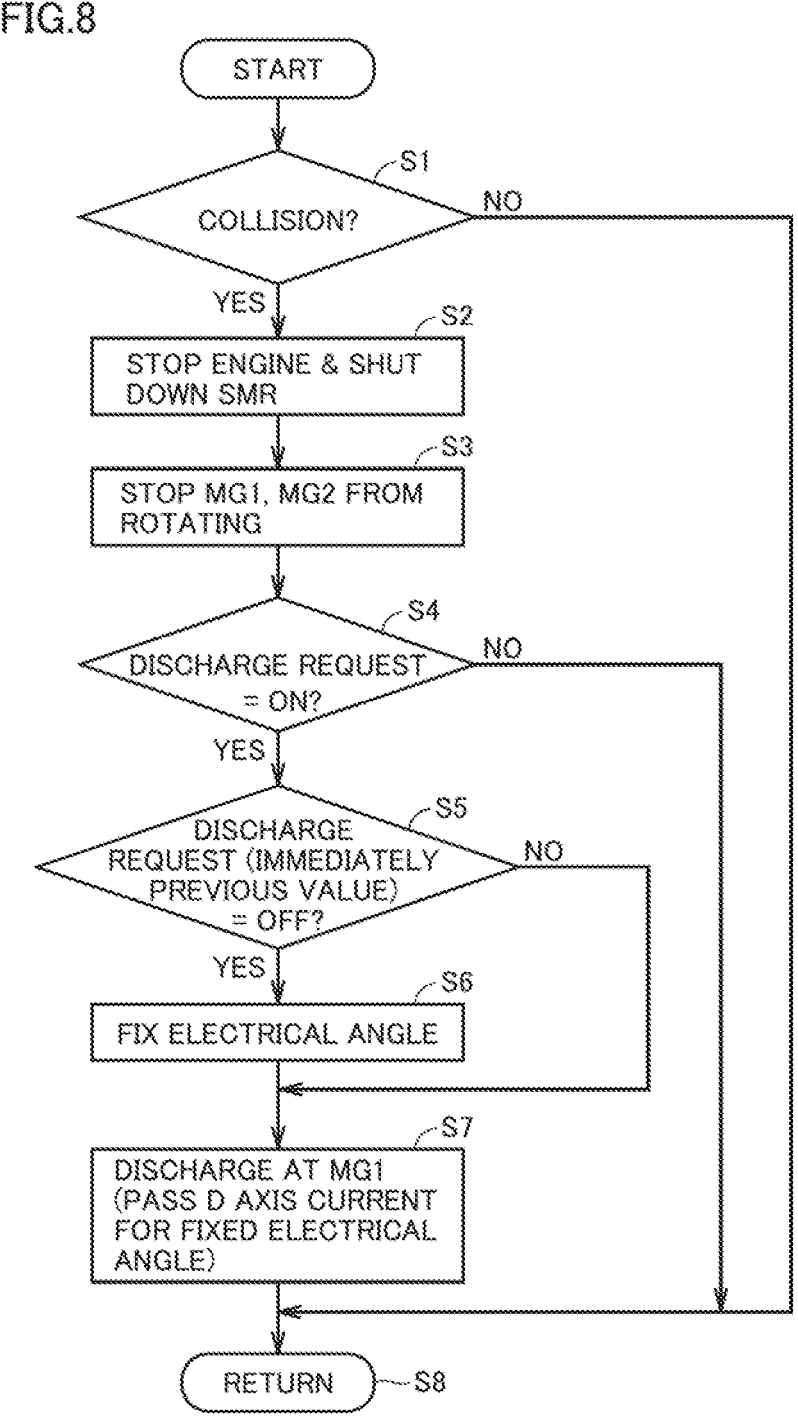
FIG. 8 is a flowchart for illustrating a discharging process performed by a hybrid ECU 144 and an MGECU 142 in a first embodiment.

FIG. 8 is a flowchart for illustrating a discharging process performed by hybrid ECU 144 and MGECU 142 in the first embodiment. This process is performed for each processing cycle of a fixed period of time.

With reference to FIG. 1 and FIG. 8, the process starts, and in step S1 whether the vehicle has a collision is determined. Air bag ECU 17 monitors whether the vehicle has a collision, and if so, air bag ECU 17 transmits a signal indicating a collision. Depending on whether the signal indicating a collision is received, hybrid ECU 144 and MGECU 142 determine whether the vehicle has a collision.

If in step S1 it is determined that the vehicle has no collision (NO in S1), the control proceeds to step S8. In contrast, if it is determined that the vehicle has a collision (YES in S1), the control proceeds to step S2. In step S2, hybrid ECU 144 and MGECU 142 stop engine ENG, and shut down system main relays SMR1 and SMR2.

Subsequently, in step S3, motor generators MG1 and MG2 are controlled to stop from rotating. For example, in FIG. 1, inverter 131 has the lower arm (i.e., switching devices Q4, Q6, Q8) turned off and the upper arm (i.e., switching devices Q3, Q5, Q7) simultaneously turned on to increase the resistance against the rotation of motor generator MG1. On the contrary, inverter 131 may have the upper arm (i.e., switching devices Q3, Q5, Q7) turned off and the lower arm (i.e., switching devices Q4, Q6, Q8) simultaneously turned on. Inverter 132 is also similarly controlled.

Subsequently in step S4 whether a discharge request has been issued is determined. When that the vehicle has a collision is sensed, the vehicle is parked and the user turns off the ignition key, or the like, hybrid ECU 144 sets the discharge request to the ON state. The discharge request is transmitted from hybrid ECU 144 to MGECU 142.

In step S4, if it is determined that the discharge request is not in the ON state (NO in S4), the control proceeds to step S8. In contrast, if it is determined that the discharge request is in the ON state (YES in S4), the control proceeds to step S5. In step S5, whether the discharge request last time (or in the immediately previous processing cycle) had a value of OFF is determined. If so (YES in S5), the control proceeds to Step S6. In that case, it is determined that the discharge request has transitioned from OFF to ON. In step S6, electrical angle θ currently sensed by rotation angle sensor 161 is stored. When the stored electrical angle is represented as θf, then, in step S7, based on electrical angle θf fixed, the q axis current Iq is set to equal 0, and in that condition, the discharge is done in MG1 to pass the d axis current, as prescribed, as the discharge current.

If in step S5 it is determined that the discharge request last time did not have the value of OFF (NO in S5), then the electrical angle has been fixed to θf, and accordingly, the control does not proceed to step S6 and instead proceeds to step S7.

Thus, according to the control provided in the present embodiment, when rotation angle sensor 161 operates properly, a discharge current is passed through motor generator MG1 without generating a torque, and if rotation angle sensor 161 has failed, motor generator MG1 can be free of a continuously generated torque and thus only be rotated by a limited rotation angle. In this case, it is not necessary, either, to change the process depending on whether rotation angle sensor 161 has failed, in particular.

Second Embodiment

In the first embodiment, when the vehicle has a collision, a control is applied so that angle θ sensed by rotation angle sensor 161 is once stored, and, after that, stored electrical angle θf is constantly applied as a rotation angle used to control the motor and in that condition the discharge current is passed through motor generator MG1.

However, even if fixed electrical angle θf is applied to the control to discharge current, a current value may be disturbed since the current feed back is applied in a case motor generator MG1 has the rotor rotated and the stator coil has passing therethrough a current deviating from a target value.

More specifically, current sensor 24 shown in FIG. 2 monitors a current passing through the stator coil of motor generator MG1, and the current control value is corrected through a feedback path via current sampling unit 205 and coordinate conversion unit 220. As such, even if the current control value is set to provide Iq=0, the control value may vary. It is because Iq deviates from zero, and accordingly, the control value may be corrected to zero the deviation when motor generator MG1 has the rotor rotated.

Accordingly, in the second embodiment, when a collision is detected and rotation angle sensor 161 senses angle θ and according thereto once a switching pattern has been determined for inverter 131 to pass the discharge current, the switching pattern is fixed. For example, angle storage unit 200 of FIG. 2 may have an angle stored therein fixed and voltage command generation unit 240 may generate fixed voltage commands Vd# and Vq#, or for example coordinate conversion unit 250 may have its output (Vu, Vv, Vw) fixed.

Figure 9:
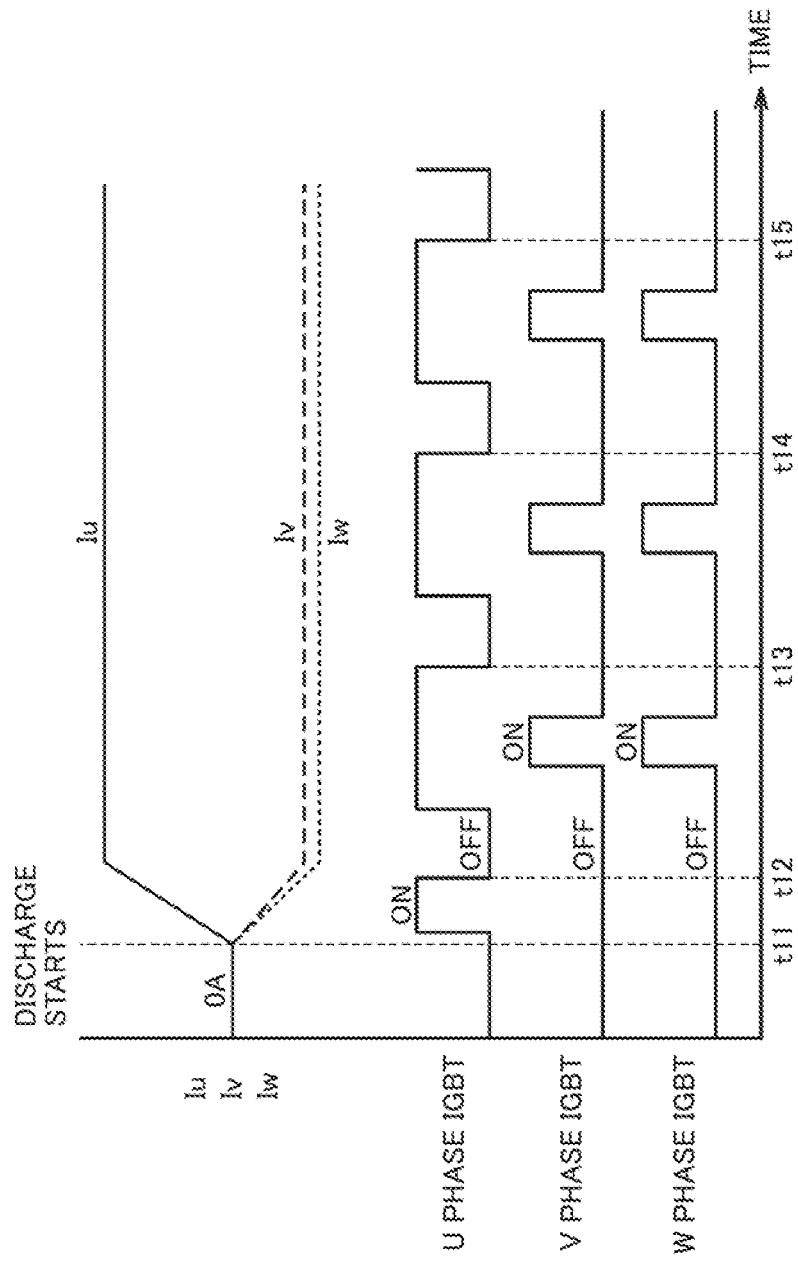
FIG. 9 is a waveform diagram for illustrating a condition in which a discharge current flows in a second embodiment.

FIG. 9 is a waveform diagram for illustrating a condition in which the discharge current flows in the second embodiment. With reference to FIG. 1 and FIG. 9, the discharge is not started before time t11, and smoothing capacitor C2 has voltage VH of 600V. At time t11, that the vehicle has a collision is sensed, and system main relays SMR1 and SMR2 are shut down, and thereafter, discharging the electric charges of smoothing capacitors C1, C2 starts. For times t11-t15, inverter 131 is controlled so that the U-, V- and W-phase coils have a positive current Iu, a negative current Iv and a negative current Iw, respectively, passing therethrough in the motor generator MG1. The U phase coil, the V phase coil, and the W phase coil each have one end connected to the neutral point and accordingly, Iu+Iv+Iw=0, and if Iu=1, switching devices Q3, Q6, Q8 have their switching duty ratio controlled to provide Iw=Iv=−0.5.

The U phase IGBT (or switching devices Q3, Q4) is switched in a pattern having a duty ratio that corresponds to Iu repeatedly for periods t12-t13, t13-t14, and t14-t15. Similarly, the V phase IGBT (or switching devices Q5, Q6) is switched in a pattern having a duty ratio that corresponds to Iv, and the W phase IGBT (or switching devices Q7, Q8) is switched in a pattern having a duty ratio that corresponds to Iw. Note that the FIG. 9 switching pattern waveforms simply represent the phases' respective duty ratios and do not represent exact switching timing.

In the second embodiment the switching devices are switched in a pattern fixed irrespective of what value rotation angle sensor 161 and current sensor 24 sense.

As a result, even when the vehicle has a vehicular wheel rotated by inertia force, external force, or the like, the discharge can be controlled in a stable manner.

FIG. 10 is a flowchart for illustrating a discharging process performed by hybrid ECU 144 and MGECU 142 in the second embodiment. This process is performed for each processing cycle of a fixed period of time.

With reference to FIG. 1 and FIG. 10, the process has steps S1-S5 identical to those described in the first embodiment with reference to FIG. 8, and the steps will not be described repeatedly.

In the second embodiment, when in step S5 it is determined that the discharge request last time had the value of OFF (YES in S5), the control proceeds to Step S6A. In that case, it is determined that the discharge request has transitioned from OFF to ON. In step S6A, a switching pattern corresponding to electrical angle θ currently sensed by rotation angle sensor 161 is fixed.

For example, angle storage unit 200 of FIG. 2 has an angle stored therein fixed to fixed angle θf, as has been described in the first embodiment, and in addition, voltage command generation unit 240 may only generate fixed voltage commands Vd# and Vq# to prevent the current feedback from operating to provide correction. Furthermore, for example, the angle may not be fixed, and coordinate conversion unit 250 may instead have its output (Vu, Vv, Vw) fixed.

Then, in step S7A, the q axis current Iq is zeroed with this fixed switching pattern applied and in that condition, inverter 131 is switched to pass d axis current Id of a prescribed value as the discharge current to provide the discharge at MG1.

The second embodiment allows the discharge to be controlled more stably than the first embodiment.

Finally, reference will again be made to the drawings to summarize the first and second embodiments. With reference to FIG. 1, the first and second embodiments provide a vehicular control device including rotation angle sensor 161 sensing a rotation angle of a rotor of a motor, and control device 140 controlling the motor based on the rotation angle sensed by rotation angle sensor 161. When control device 140 controls the motor and detects that the vehicle has a collision, control device 140 determines a switching pattern, based on the rotation angle obtained from rotation angle sensor 161, to switch a switching device of an inverter that drives the motor to zero a q axis current and also pass a d axis current, and once the switching pattern has been determined, then, whatever rotation angle may be sensed by the rotation angle sensor, the determined switching pattern is applied to continue to switch the switching device to discharge the electric charges of smoothing capacitors C1, C2 connected to the inverter of the motor.

If rotation angle sensor 161 has failed, and the vehicle has a collision, smoothing capacitors C1, C2 can still be discharged. If rotation angle sensor 161 operates properly, the discharge can be done without generating a torque in the motor, and even if rotation angle sensor 161 does not operate properly, a discharge current can be passed with the motor's rotation minimized.

While the motor controlled as described above may be motor generator MG2, it is preferably motor generator MG1 operating mainly as an electric power generator. The vehicle further includes a second motor generator operating mainly as an electric motor to drive a vehicular wheel. Control device 140 passes a current through motor generator MG1, rather than motor generator MG2, to discharge the electric charge of the smoothing capacitor when the vehicle has a collision.

As has been described with reference to FIG. 6, this further reduces the motor's rotation (or the vehicle's movement) to be smaller than discharging via motor generator MG2 does.

Preferably, as has been indicated in the first embodiment with reference to FIG. 2, when the control device 140 detects that the vehicle has a collision, control device 140 stores rotation angle θ sensed by rotation angle sensor 161 and fixes the switching pattern by generating the current control value, with the stored rotation angle constantly applied θf as a rotation angle used to control the motor, to zero the q axis current and pass the d axis current.

If rotation angle sensor 161 has failed, and the vehicle has a collision, smoothing capacitors C1, C2 can still be discharged.

Preferably, as has been indicated in the second embodiment, control device 140 generates a switching waveform, based on a voltage command and an output of the rotation angle sensor, for switching the switching device of the inverter. Control device 140, before detecting a collision, feeds back a difference between a motor current and the current control value to correct a control value, and, as shown in FIGS. 9 and 10, after the collision is detected, control device 140 stops feeding back the difference, and, irrespective of the output of rotation angle sensor 161, control device 140 constantly outputs to inverter 131 a switching pattern corresponding to a fixed rotation angle.

If rotation angle sensor 161 has failed, and the motor rotates, the current feedback can be prevented from having an effect to destabilize the discharge current.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

What is claimed is:

1. A vehicular control device that provides a current control value for (i) a q axis current generating a torque and (ii) a d axis current generating a magnetic field, to a motor mounted in a vehicle to control the motor, the vehicular control device comprising:

a rotation angle sensor that senses a rotation angle of a rotor of the motor; and a control unit that controls the motor based on the rotation angle sensed by the rotation angle sensor, the control unit being configured so that when the control unit receives a signal indicating an occurrence of a collision of the vehicle, the control unit (1) determines a switching pattern, based on the rotation angle obtained from the rotation angle sensor, to switch a switching device of an inverter that drives the motor to: (a) zero the q axis current, and (b) pass the d axis current, and (2) once the switching pattern has been determined, then, whatever rotation angle may be sensed subsequently by the rotation angle sensor, applies the switching pattern to discharge an electric charge of a smoothing capacitor connected to the inverter of the motor.

2. The vehicular control device according to claim 1, wherein:

the motor is a first motor generator operating mainly as an electric power generator;

the vehicle further includes a second motor generator operating mainly as an electric motor to drive a vehicular wheel of the vehicle; and the control unit is configured to pass the d axis current through the first motor generator, rather than the second motor generator, to discharge the electric charge of the smoothing capacitor when the vehicle has the collision.

3. The vehicular control device according to claim 1, wherein the control unit is configured so that when the control unit receives the signal indicating the occurrence of the collision, the control unit stores the rotation angle sensed by the rotation angle sensor and fixes the switching pattern by generating the current control value to: (a) zero the q axis current, and (b) pass the d axis current, with the stored rotation angle constantly used to control the motor.

4. The vehicular control device according to claim 1, wherein:

the control unit is configured to generate a switching waveform, based on a voltage command and an output of the rotation angle sensor, for switching the switching device of the inverter; and the control unit is configured to, before receiving the signal indicating the occurrence of the collision, feed back a difference between a motor current and the current control value to correct a control value, and after receiving the signal indicating the occurrence of the collision, stop feeding back the difference, and, irrespective of what output the rotation angle sensor provides, the control unit constantly outputs to the inverter the switching pattern corresponding to a fixed rotation angle.

* * * * *